United States Patent

Hundere

[15] 3,670,561
[45] June 20, 1972

[54] APPARATUS FOR DETERMINING THE THERMAL STABILITY OF FLUIDS

[72] Inventor: Alf Hundere, P.O. Box 28299, San Antonio, Tex. 78228

[22] Filed: Jan. 30, 1970

[21] Appl. No.: 7,133

[52] U.S. Cl. ............................................. 73/61.2, 73/15 R
[51] Int. Cl. ....................................................... G01n 33/22
[58] Field of Search .......................................... 73/61.2, 15 R

[56] References Cited

UNITED STATES PATENTS

| | | | |
|---|---|---|---|
| 3,141,324 | 7/1964 | Boies et al. | 73/61.2 |
| 3,229,499 | 1/1966 | Shayeson et al. | 73/15 |
| 3,318,667 | 5/1967 | Fabuss et al. | 73/61.2 UX |
| 3,529,464 | 9/1970 | Lander, Jr. et al. | 73/61.2 |

Primary Examiner—Louis R. Prince
Assistant Examiner—Joseph W. Roskos
Attorney—Ralph R. Browning

[57] ABSTRACT

An apparatus for determining the thermal stability of fluids, particularly for testing the deposition characteristics of jet fuels, comprising a single reservoir for containing fresh and tested fuel on opposite sides of a movable piston therein, a supply line connecting the fresh fuel chamber of the reservoir with a housing in which is mounted a heated tubular member, a return line connecting the outlet of the housing with the tested fuel chamber of the reservoir, a constant speed metering pump located in the return line between the housing and the tested fuel chamber of the reservoir to pump the fuel through the apparatus, a filter, designed to trap deposits which remain suspended in the fuel due to heating, located at the outlet of the housing, and a differential pressure measuring device connected across the filter to measure the pressure drop therethrough, and a valved bypass around the filter. The apparatus also contains a source whereby the entire system may be pressurized to a constant pressure, preferably with an inert gas.

8 Claims, 3 Drawing Figures

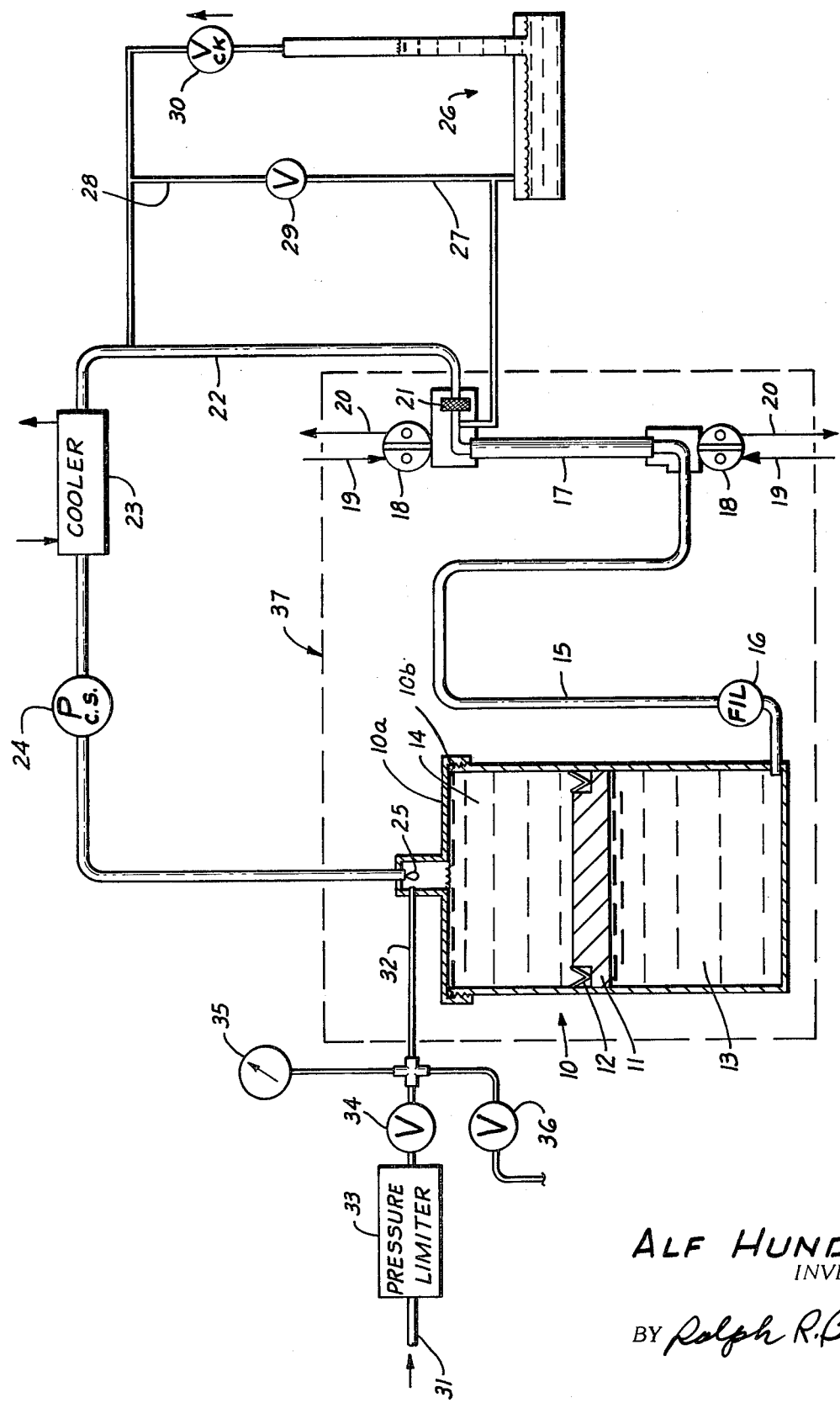

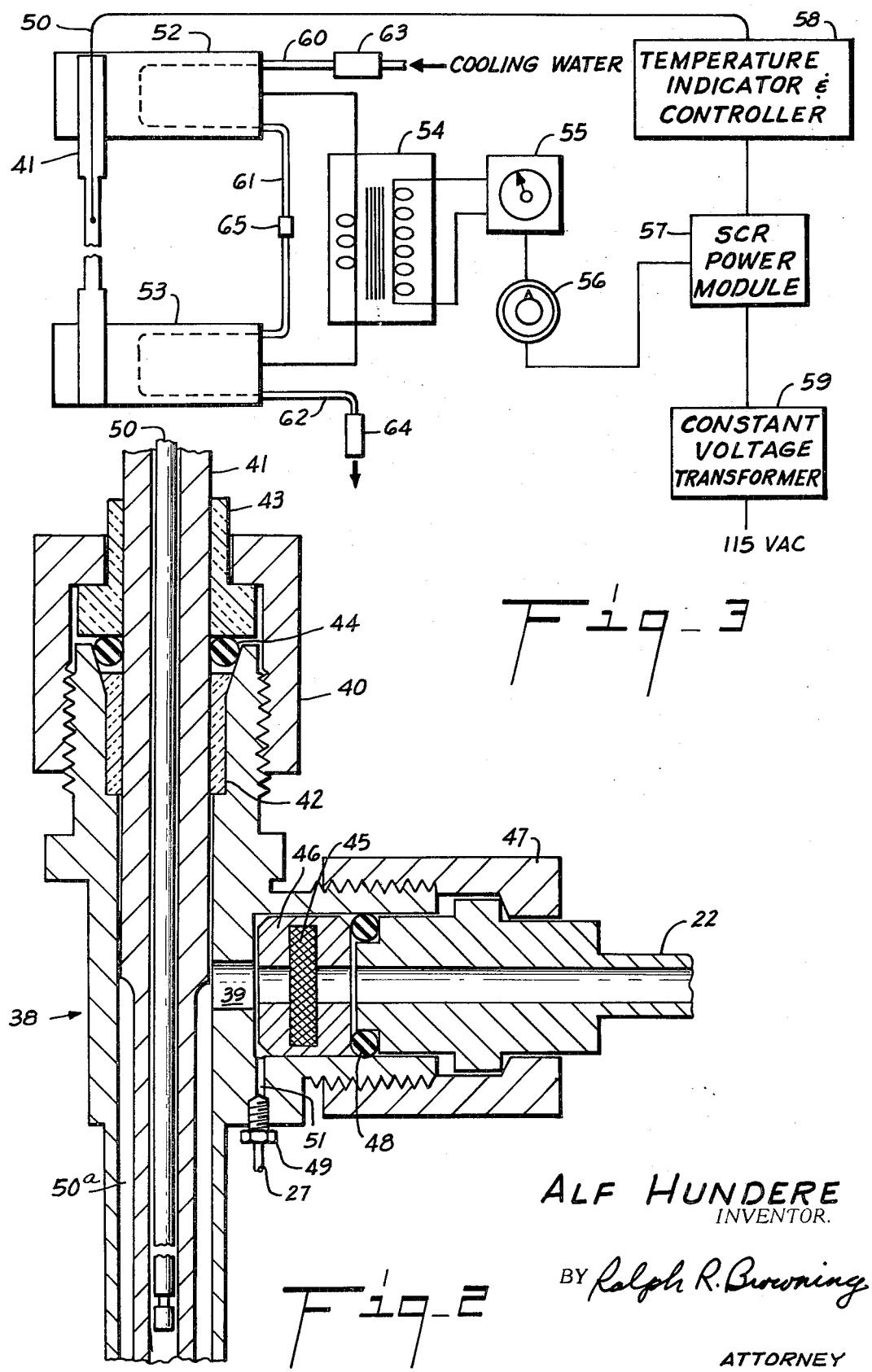

APPARATUS FOR DETERMINING THE THERMAL STABILITY OF FLUIDS

BACKGROUND OF THE INVENTION

The present invention relates to an apparatus for measuring the thermal characteristics of fluids. More particularly, the present invention relates to an apparatus for measuring the thermal oxidation tendencies of fluids, especially fuels used in gas turbines of jet aircraft and the like.

The fuel utilized in gas turbines powering jet aircraft contacts heated surfaces in flowing through the fuel system. The surface temperature of these surfaces, as well as the fuel temperature itself, is greatest for supersonic aircraft when the fuel becomes an important heat sink to cool such items as the lubricating oil. Any given jet fuel, like all other fluids, has a limiting temperature above which deposits form on the heated surface that it contacts and/or remain suspended in the fuel. These deposits result in various harmful effects in a jet engine, such as reducing heat transfer, closing passages such as fuel nozzles and fuel filters. Furthermore, loss of heat transfer from fuel deposits becomes an important consideration for a heat exchanger where the fuel is the cooling media. The tendency of a jet fuel or any fluid to form deposits is increased by the dissolved oxygen from the air it contacts, as well as by various impurities.

It has long been recognized that it is necessary to have a test device to rate the thermal oxidation characteristics of jet fuels whereby their deposition tendencies can be determined prior to use in aircraft. One presently available apparatus for testing the thermal oxidation of fuels passes the fuel over an internally heated metallic tube and through an annulus formed by another tube spaced around the outside. The fuel is run at a specified fuel outlet temperature for a fixed period of time, at the end of which, the inner tube is visually examined to determine how much discoloration the fuel has caused by deposits forming on the tube. The apparatus also makes use of a heated test filter through which the fuel passes after passing through the annulus around the heated tube. The filter tends to pick up any deposits which may have been formed under the heating conditions. This apparatus has suffered from several disadvantages in that the primary variable, the surface temperature, is not measured and controlled and the sample size is extremely large in comparison with other specification tests for jet fuels.

SUMMARY OF THE INVENTION

It is therefore an object of the present invention to provide an apparatus for the testing of fluids.

It is another object of the present invention to provide an apparatus for testing the thermal oxidation characteristics of fluids.

Still another object of the present invention is to provide an apparatus for measuring the tendency of fluids, particularly jet fuels, to form deposits when contacting a heated surface of measured and controlled temperature.

A further object of the present invention is to provide an apparatus for testing the thermal-oxidation tendencies of fluids, particularly jet fuels, which apparatus has a relatively small sample size requirement as well as being simple of construction and easy to operate.

These and other objects of the present invention will become apparent from the drawings and description given herein and the appended claims.

BRIEF DESCRIPTION OF THE DRAWINGS

FIG. 1 is a schematic diagram of the apparatus of the present invention.

FIG. 2 is a partial cross-sectional diagrammatic view of the heater tube assembly of the apparatus set forth in FIG. 1.

FIG. 3 is a schematic diagram of the heating and cooling systems employed in the apparatus of FIG. 1.

DESCRIPTION OF THE PREFERRED EMBODIMENT

Reference is now made to FIG. 1 for a detailed description of one embodiment of the apparatus of the present invention. Reservoir 10, of generally cylindrical shape, has therein movable piston 11 equipped with V-seal 12 whereby reservoir 10 may be divided into two chambers as piston 11 moves from one end of reservoir 10 to the other end. Reservoir 10 is equipped with screw cap 10a which, when used with gasket 10b, makes reservoir 10 substantially air tight. Fresh test fuel 13 is contained in the bottom section or feed chamber of reservoir 10 whereas tested fuel 14 is contained in the top section or return chamber of reservoir 11. Conduit 15 connects the outlet of reservoir 10, connected into the feed chamber, with the heater tube assembly shown generally at 17. Filter 16 is located in conduit 15 to remove any solids which may be present in the fresh test fuel 13. Heater tube assembly 17 is equipped with heater-cooler assembly 18 located at each end thereof. Assembly 18 contains electrical connections to heat the heater tube which is a part of the heater-tube assembly and which is described in greater detail hereafter, and also provides cooling to the electrical connectors. Cooling water enters assembly 18 via line 19 and exits via line 20. Return conduit 22 connects the outlet of heater-tube assembly 17 with the return chamber via the inlet of the reservoir 10. A precision filter 21 is located in conduit 22. Also located in line 22 is cooler 23 to cool the fluid returning to reservoir 10 via line 22 and a constant speed metering pump to pump the fluid through the system. Manometer 26 is connected across filter 21 whereby the pressure differential across filter 21 may be measured. A bypass system consisting of conduit 27, valve 29 and conduit 28 is also provided whereby if filter 21 has excessive pressure drop, the fluid flowing out of heater-tube assembly 17 may bypass filter 21 and instead pass through line 27, valve 29 and conduit 28 back into return conduit 22 upstream from cooler 23. Manometer 26 is also equipped with check valve 30 which prevents mercury from being forced into conduit 22 should filter 21 become excessively plugged and valve 29 be closed. The apparatus is also equipped with drip-flow indicator 25 whereby the flow rate therethrough may be ascertained. The internal pressure of the apparatus is maintained at a substantially constant level with a gas pressurizing means consisting of a source of a suitable gas such as nitrogen, shown at 31, a pressure limiter 33 to prevent excessive pressure in the apparatus, a main pressurizing valve 34 and conduit 32 leading to reservoir 10. A pressure age 35 and a bleed valve 36 are also connected to conduit 32. All of the components are placed within a housing designed such that those shown within dotted line 37 are readily accessible to an operator who can remove them for cleaning and filling reservoir 10 with the fresh test fuel to be evaluated.

From the above description of the apparatus, the operation will be obvious. Fresh test fuel 13, under evaluation, flows out of reservoir 10 through filter 16, conduit 15 and enters heater-tube assembly 17 where it passes over a heater tube mounted within heater-tube assembly 17. The fuel exits from heater tube assembly 17 and flows through filter 21, conduit 22, cooler 23, pump 24, which insures constant volumetric flow as well as driving the fuel through the apparatus, and returns through drip-flow indicator 25 to the top-most chamber of reservoir 10 above piston 11. As can be seen, with valve 36 closed and valve 34 open, the entire internal pressure of the apparatus is constant, the force to drive the fluid through the apparatus being supplied by metering pump 24. Sufficient pressure in the system is normally maintained to prevent boiling of the test fuel when it contacts the heater surface. As fresh test fuel 13 flows through the apparatus and is heated in contacting the heater tube, deposits will form on the surface of the heater tube and/or collect on the filter 21 if the heater tube is operated at a temperature above that which the test fuel is capable of withstanding without chemical breakdown. As deposits collect on filter 21, the pressure drop thereacross is measured by manometer 26. The amount of deposits on the heater tube and the increase in the filter pressure differential give a dual indication of the thermal oxidation tendencies of the fuel tested. Should filter 21 become clogged to the point of causing a pressure drop exceeding the limit of the manometer, the bypass system described above consisting of line 27, valve 29 and line 28 comes into operation. In this event, test fuel 13 may then exit through line 27, pass through open valve 28 and return to return line 22 via conduit 28. Also, in the event that valve 29 is not open and filter 21 becomes excessively plugged, manometer 26 is equipped with a check valve 30 which in practice is equipped with a suitable transducer device to shut down the entire operation of the apparatus.

Reference is now made to FIG. 2 for a detailed description of the heater-tube assembly shown at 17 in FIG. 1. Housing 38 having a generally cylindrical bore therethrough is equipped with outlet 39 and inlet (not shown) of similar character. Each end of housing 38 is equipped with a removable cap 40 through which is mounted heater tube 41 comprising a tubular metallic member which in the preferred case has a substantially constant internal diameter, but an outside diameter which is larger at the extremities than in the central portion. Heater tube 41 is electrically insulated from housing 38 and cap 40 by means of ceramic insulators 42 and 43 respectively. 0-ring seals 44 on each end of housing 38 prevent leakage of the fluid out of housing 38 around heater tube 41. Also shown in FIG. 2 is a detail of test filter 21 of FIG. 1. The test filter consists of a piece of precision woven stainless steel cloth 45 held in filter mount 46. Filter mount 46 and conduit 22 are secured to housing 38 by means of removable cap 47, an o-ring 48 being used to seal against leakage. Connection to manometer 26 is provided by conduit 27 attached to threaded connector 49 silver soldered into housing 38. Thermocouple 50 is mounted inside heater tube 41 to measure the temperature therein. Thermocouple 50 is normally positioned to sense and control the maximum temperature of the heater tube 41. As can be seen on examining FIG. 2, the fuel upon flowing through annulus 50a between the internal walls of housing 38 and the exterior surface of heater tube 41 passes out of housing 38 through outlet 39. Should filter 45 become clogged, the fuel bypasses filter 45 and instead flows through passage 51 as generally described above in FIG. 1.

The heater tube 41 is heated by flowing electricity directly therethrough. This method of heating has several advantages in that it leaves the inside of the heater tube open so that its entire length may be probed for temperature measurement, it permits a minimum diameter of one-eighth inch or smaller with very high heat flux, it allows the tube to be manufactured from any material available in tubing form such as aluminum for lower temperatures and stainless steel or titanium for higher temperatures and it is so economical that a new heater tube can be used for each test. A convenient scheme for electrically heating the heater tube 41 is depicted in FIG. 3. Heater tube 41 is clamped into the ends of buss connectors 52 and 53 which receive electrical power from low voltage transformer 54 which preferably has a step-down ratio as required to match the electrical resistance of heater tube 41. Wattmeter 55 serves to measure the total flow of electric power in transformer 54. Power to wattmeter 55 and transformer 54 is supplied through variable transformer 56 which in turn is connected to power module 57. An automatic temperature indicator and controller 58, also connected to power module 57, is connected to thermocouple 50 whereby the temperature of heater tube 41 may be measured and automatic control thereof accomplished by controller 58 as desired. The whole system receives power through a constant voltage transformer 59 which is connected directly to the line voltage and serves to smooth any fluctuation therein. To maintain buss connectors 52 and 53 at constant temperature, cooling water is supplied via line 60, passing through buss connector 52, conduit 61 into buss connector 53 and exiting via conduit 62. Conduits 60 and 62 are electrically insulated from the rest of the system by nylon blocks 63, 64 and 65. This is of course necessary due to the electrical potential existing between buss connectors 52 and 53.

The tubular member employed as the heater tube is generally of circular cross-sectional shape and must be of metallic construction. While other metals such as stainless steel may be employed, it is preferred that the heater tube be constructed of aluminum for minimum manufacturing cost unless the operating temperature involved requires a higher temperature material, or it is desired to duplicate the metal material used in a specific end application. Whatever the type material chosen for use in constructing the heater tube, its internal diameter will range usually between one-sixteenth inch and one-fourth inch. An important consideration in the manufacture of the heater tube is that of obtaining a surface finish suitable for rating the level of fuel deposits obtained from a test. Normally, this requires a highly polished surface that can be accurately maintained with consistency so that deviations from tube to tube will be minimum. The deposition level can be either evaluated visually in comparison with a color standard, or by the readout from a tube deposit rater using reflected light, beta-ray backscatter, or some other suitable means for sensing the level of deposits.

As will be readily recognized, the level of deposit formation at a given heater tube temperature for a given test fuel is, among other things, a function of the time the test fuel is in contact with the heater tube; i.e., the residence time. By changing the speed of the pump 24 the residence time can be changed to duplicate that occurring in the end use of an engine but normally the residence time is held at about ten seconds. Generally, the pump will have a capacity of from one to ten cc per minute, the reservoir usually having a capacity of from 500 to 1,500 cc.

The test filter through which the fuel passes after being subjected to heating is preferably constructed of precision woven stainless steel cloth and has a porosity ranging from five to twenty microns, with seventeen microns normally being used. Also, it is preferable that the effective filter diameter through which the heated fuel passes be from around 0.050 to 0.150 inches, with 0.100 normally being used.

While in the embodiment described nitrogen is the pressurizing gas, it is to be understood that other gases such as helium, argon, etc., can be employed as well as nitrogen. Air can be employed as the pressurizing gas if safety is not a factor. The pressurizing gas source should be capable of supplying a pressure somewhat greater than the vapor pressure of the test fuel involved at the selected temperature of the heater tube. A pressure of 300 psig is normally used for testing jet fuels.

As can be seen from examining the above description of the apparatus, the present invention provides an easy and relatively accurate means to test the deposition property, particularly that caused by thermal oxidation, of fuels such as jet fuels when subjected to a heated surface.

I claim:

1. An apparatus for testing the thermal oxidation stability of fluids such as jet fuels, comprising in combination: a closed reservoir having a movable piston therein, said piston serving to form a feed chamber and a return chamber within said reservoir as said piston moves from one end of said reservoir to the opposite end of said reservoir, said reservoir having an inlet connected to said return chamber and an outlet connected to said feed chamber; a housing having an inlet and an outlet for flowing said fluid therethrough; first conduit means connecting the outlet of said reservoir with the inlet of said housing; a metallic tubular member removably mounted in said housing such that said fluid flowing through said housing passes over the exterior surface of said tubular member; said tubular member having a substantially constant internal diameter, the outside diameter being larger at the extremities than in the central portion thereof; means electrically insulating said tubular member from said housing; means to heat said tubular member by passage of electric current therethrough and thereby heat said fluid flowing through said housing; temperature sensing means mounted inside said tubular member; second conduit means connecting the outlet of said housing with the inlet of said reservoir; filter means located in said second conduit means for trapping any suspended solids formed by heating of said fluid in said housing; differential pressure measuring means located in said second conduit means so as to measure the pressure drop across said filter means and thereby indicate the degree of solids buildup on said filter means, the degree of solids buildup on said filter means together with the degree of deposits on said tubular member being indicative of said thermal oxidation stability of said fluid; constant speed pump means located in said second circuit means between said filter means and said inlet to said reservoir; cooler means to cool fluid passing through said second conduit means, said cooler means located in said second conduit means between said pump means and said filter means; and means to maintain the internal pressure of said apparatus at a substantially constant level sufficient to prevent boiling of the fluid under test.

2. The apparatus of claim 1 wherein said reservoir has a substantially cylindrical shape.

3. The apparatus of claim 1 wherein said housing is substantially cylindrical and has a removable cap on each end thereof, said tubular member extending through each of said caps, said caps having sealing means to prevent the leakage of said fluid out of said housing around said tubular member.

4. The apparatus of claim 1 having a filter means located in said first conduit means.

5. The apparatus of claim 1 wherein said filter means located in said second conduit means comprises stainless steel cloth having a porosity of from 5 to 20 microns and a diameter of 0.050 to 0.150 inch.

6. The apparatus of claim 1 wherein said means to maintain the internal pressure of said apparatus substantially constant comprises a source of an inert gas supplied to the return chamber of said reservoir.

7. The apparatus of claim 1 having a bypass means whereby said fluid flowing out of said housing may bypass said filter located in said second conduit means and then be returned into said second conduit means upstream from said cooler means.

8. The apparatus of claim 1 where said tubular member has an internal diameter in the range of from one-sixteenth to one-fourth inch, said reservoir has a capacity of from 500 to 1,500 ml and said pump has a fixed flow rate of from 1 to 10 cc per minute.

* * * * *